United States Patent
Luo et al.

(10) Patent No.: US 10,074,953 B2
(45) Date of Patent: Sep. 11, 2018

(54) EROSION RESISTANT ELECTRODES FOR USE IN GENERATING GAS DISCHARGE LASER

(71) Applicants: Siqi Luo, Ladera, CA (US); Richard Carl Ujazdowski, Poway, CA (US); Walter Dale Gillespie, Poway, CA (US); Thomas Patrick Duffey, San Diego, CA (US)

(72) Inventors: Siqi Luo, Ladera, CA (US); Richard Carl Ujazdowski, Poway, CA (US); Walter Dale Gillespie, Poway, CA (US); Thomas Patrick Duffey, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 14/872,018

(22) Filed: Sep. 30, 2015

(65) Prior Publication Data

US 2017/0093112 A1   Mar. 30, 2017

(51) Int. Cl.
*H01S 3/038* (2006.01)
*H01S 3/097* (2006.01)
*H01S 3/225* (2006.01)
*H01S 3/0971* (2006.01)

(52) U.S. Cl.
CPC ............ *H01S 3/0385* (2013.01); *H01S 3/097* (2013.01); *H01S 3/0382* (2013.01); *H01S 3/0971* (2013.01); *H01S 3/225* (2013.01)

(58) Field of Classification Search
CPC ...... H01S 3/0385; H01S 3/097; H01S 3/0971; H01S 3/225; H01S 3/0382
See application file for complete search history.

(56) References Cited

U.S. PATENT DOCUMENTS

| | | |
|---|---|---|
| 2005/0047471 A1 | 3/2005 | Steiger et al. |
| 2005/0175054 A1* | 8/2005 | Shackleton ........... H01S 3/0315 372/55 |
| 2011/0058580 A1 | 3/2011 | Sandstrom et al. |
| 2013/0329763 A1 | 12/2013 | Kardokus et al. |

OTHER PUBLICATIONS

Notification of Transmittal of the International Search Report and the Written Opinion issued in International Application No. PCT/US16/52001, dated Feb. 2, 2017 (13 total pages).

* cited by examiner

*Primary Examiner* — Xinning Niu (57) ABSTRACT

Anodes and cathodes for use in generating gas discharge laser light are disclosed. The improved anode has a transition portion that includes a substantially vertical sidewall to transition between the active portion and the end portion to reduce erosion-related issues. The improved cathode has thickened spine portions in enhanced erosion locations. The spine portions are thickened by removing material from the shoulder of the cathode stepped cross-section profile in those locations in order to improve the longevity of the cathode.

15 Claims, 6 Drawing Sheets

EROSION RESISTANT ELECTRODES FOR USE IN GENERATING GAS DISCHARGE LASER

BACKGROUND OF THE INVENTION

Excimer laser chambers have long been employed to generate gas discharge laser light for integrated circuit lithography. Generally speaking, an excimer laser chamber may include a housing within which there exist a set of spaced-apart electrodes, a circulation system for circulating an appropriate laser gas (typically under pressure) between the electrodes, and pulsing circuitry for pulsing the electrodes. The laser gas may comprise a mixture of suitable gases, including without limitation fluorine, krypton, and neon, for example.

For ease of referencing and not by way of limitation, the upper electrode may be thought of generally as the cathode and maybe rapidly pulsed with negative electrical signal pulses while the lower electrode, which may be thought of as the anode, may be grounded. This is a typical configuration and variations may exist and thus no limitation is intended by this example.

The pulses across the electrodes cause electrical discharge in the spatial region between the electrodes. This electrical discharge excites the laser gas to produce pulses of laser light for photolithography purposes, as is well known to those familiar with laser-based photolithography.

For background reading, U.S. Pat. No. 6,466,602B1 and U.S. Pat. No. 7,301,980B2 (both incorporated herein by reference) describe some example excimer laser chambers and components thereof.

As integrated circuit features become smaller and smaller, it is increasingly important to maintain the quality of the output laser light for photolithography purposes during production. This is because variations in the output laser light result in inconsistent exposure of the photoresist from die to die and/or from wafer to wafer. Since the electrical discharges between the electrodes erode the electrodes over time, it is important to design electrodes for longevity (a metric for which may be mean time between service or MTBS) as well as for consistent output light quality over the lifetime of the electrodes.

The present invention relates to improved designs for electrodes for use in excimer laser chambers.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Embodiments of the invention relate to improved erodable electrodes for use in generating gas discharge lasers. More specifically, one or more embodiments of the invention relate to improved erodable anodes for use in generating gas discharge lasers.

In one or more embodiments, the erodable anode is elongated and includes an active portion and an end portion. The active portion has a thickness that is greater than the thickness of the end portion. A transition structure that includes substantially vertical sidewalls connects the active portion and the end portion. In one or more embodiments, the active portion further comprises a non-tapered active portion and a tapered active portion, with the thickness of the tapered active portion being less than the thickness of the non-tapered active portion. The transition structure couples the tapered active portion to the aforementioned end portion.

Additionally or alternatively, one or more embodiments of the invention relate to improved erodable cathodes for use in generating gas discharge lasers. In one or more embodiments, the improved erodable electrode includes an active portion and an end portion. The active portion has first stepped cross-section profile. The end portion has a second stepped cross-section profile. The shoulder of the second stepped cross-section profile is lowered to render a height of a step of the second stepped cross-section profile greater than the height of a step of the first stepped cross-section profile.

Figure 1:
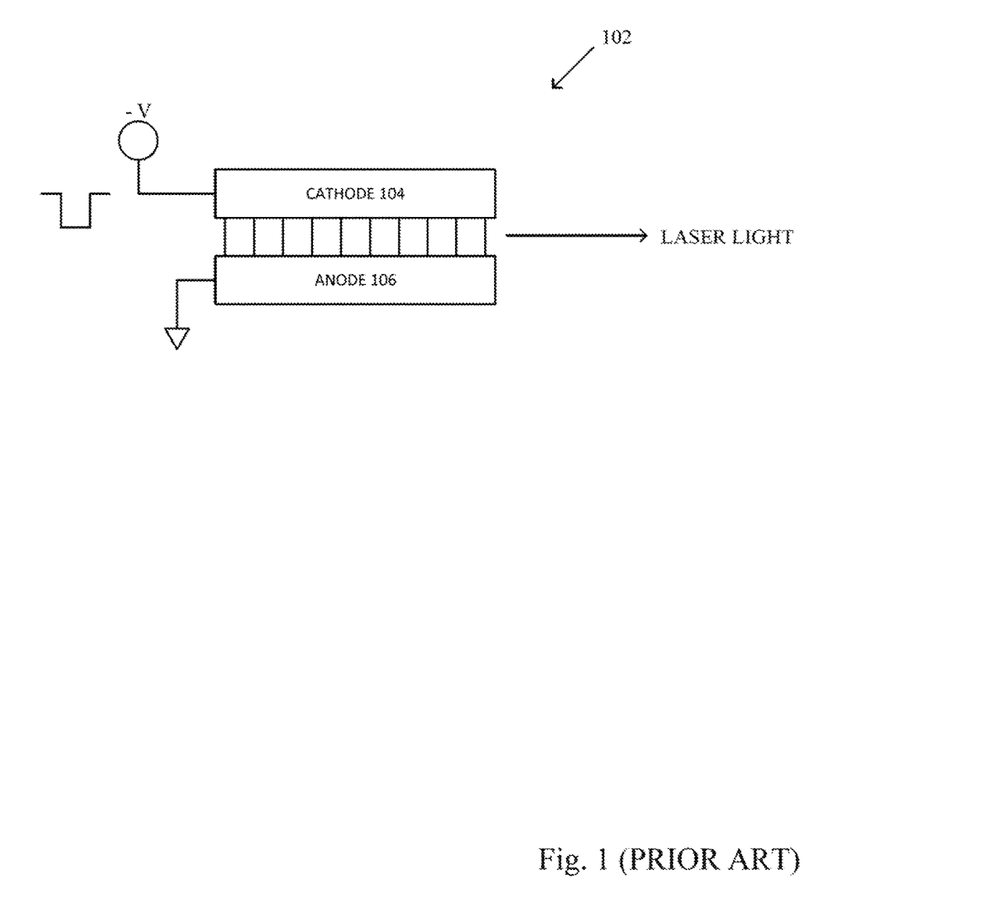
FIG. 1 shows a simplified conceptual representation of an excimer laser chamber having spaced-apart upper cathode and lower anode.

To facilitate discussion, FIG. 1 shows a simplified conceptual representation of an excimer laser chamber 102 having spaced-apart upper cathode 104 and lower anode 106. This is a typical configuration and variations may exist and thus no limitation is intended by this example with respect to, for example, electrode electrical polarity or the relative spatial orientation (e.g., above vs. below or left vs. right) of the cathode versus the anode.

Cathode 104 may be energized by negative pulses while anode 106 may be grounded. The rapid negative pulses create electrical discharges between cathode 104 and anode 106. The electrical discharge between cathode 104 and anode 106 excites the laser gas that circulates in between cathode 104 and anode 106 and generates laser light as a result. The laser light may undergo additional processing using a variety of optical components and techniques to eventually be employed to expose the photoresist on the wafers.

Figure 2A:
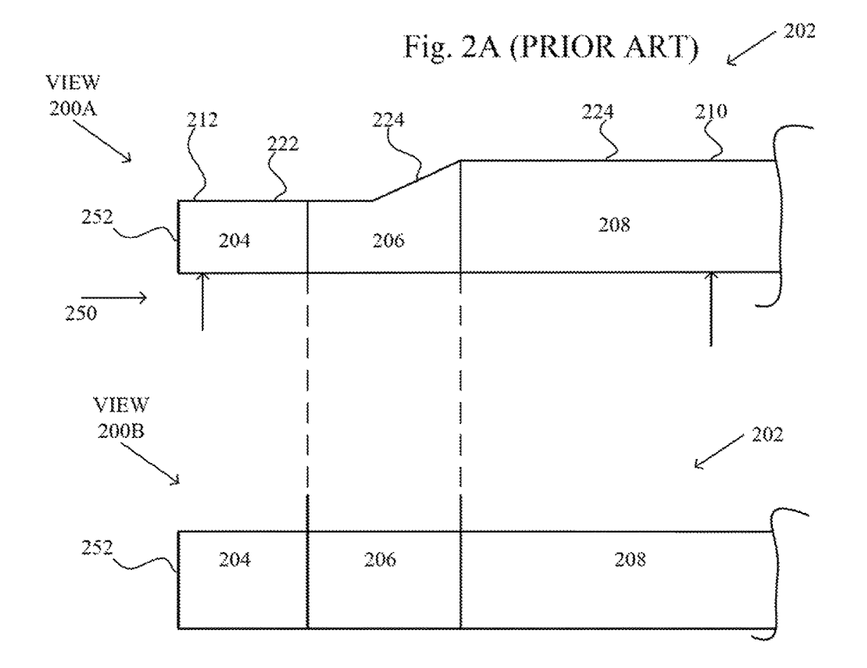
FIG. 2A shows an example of a prior art anode.

FIG. 2A shows an example of a prior art anode 202. Prior art anode 202, in the top view 200A, includes an end portion 204, a roll-off portion 206, and an active portion 208. These also correspond to reference numbers 202, 206, and 208 of the side view 200B. The active portion 208 represents the portion of the elongated anode where electrical discharge occurs by design. For example, an active portion of the anode may represent the portion of the anode that is disposed opposite a structural feature of the cathode where electrical discharge is designed to occur. Limited or no electrical discharge is intended for the end portion of the anode. The roll-off portion represents the transition portion.

As can be seen in FIG. 2A, prior art anode 202 includes an active portion 208 that has a greater thickness 210 than the thickness 212 of end portion 204. The difference in thicknesses may be about 3 mm, in an example implementation.

The transition between thicker active portion 208 and end portion 204 is implemented by roll-off portion 206, whereby the top surface 220 of active portion 208 tapers toward top surface 222 of end portion 204. This taper is represented by sloped surface 224 of roll-off portion 206. It is thought that the use of a gradually sloped surface would eliminate or minimize sharp physical discontinuities between active portion 208 and end portion 204, thereby reducing discharge-induced non-uniformities. Discharge non-uniformities may cause an increase or decrease in electrode erosion, leading to uneven electrode profiles after long periods of use. These uneven profiles may limit electrode lifetime.

Figure 2B:
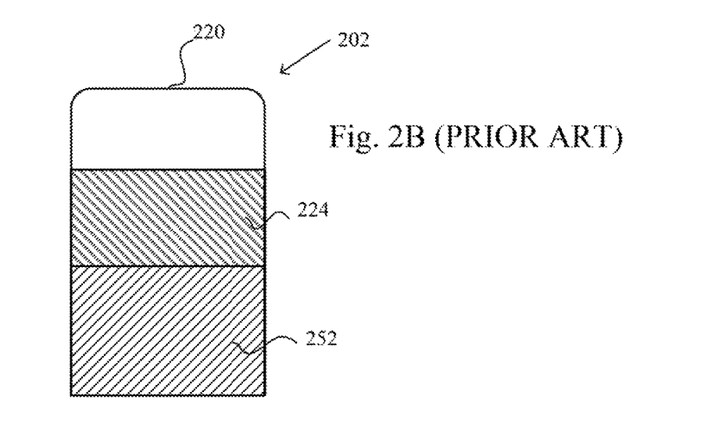
FIG. 2B shows a front view profile of the prior art anode of FIG. 2A.

FIG. 2B shows a front view profile of anode 202 when viewed along the direction of arrow 250 of FIG. 2A. In FIG. 2B, front wall 252 of end portion 204 and sloped surface 224 are shown. As is typical, top surface 220 of the active portion 208 has a domed profile.

Contrary to the commonly-held belief that a gradually sloped transition between the active portion and the end portion would reduce physical discontinuities and thereby would reduce the likelihood of non-uniform erosions, it has been discovered by the inventors that the sloped transition actually results in a sharper shape due to fluorine corrosion and result in short performance lifetime. A further discovery by the present inventors relates to the fact that although the sidewalls of the active portion 208 may be substantially vertical and the transition from the vertical sidewalls of active portion 208 to domed top 220 is nowhere nearly as gradual as the slope of sloped surface 224 of roll-off region 206, the active portion 208 possesses very uniform erosion properties. This is also counter-intuitive.

Generally speaking, sharp physical discontinuities leads to locally enhanced electrical discharges between the cathode and the anode. For example, a sharp protruding feature (i.e., protruding into the spatial region between the cathode and the anode or simply above the surface of the electrode) may serve to unduly concentrate electrical discharge in its vicinity, thereby increasing the electrode erosion in that region.

Figure 3A:
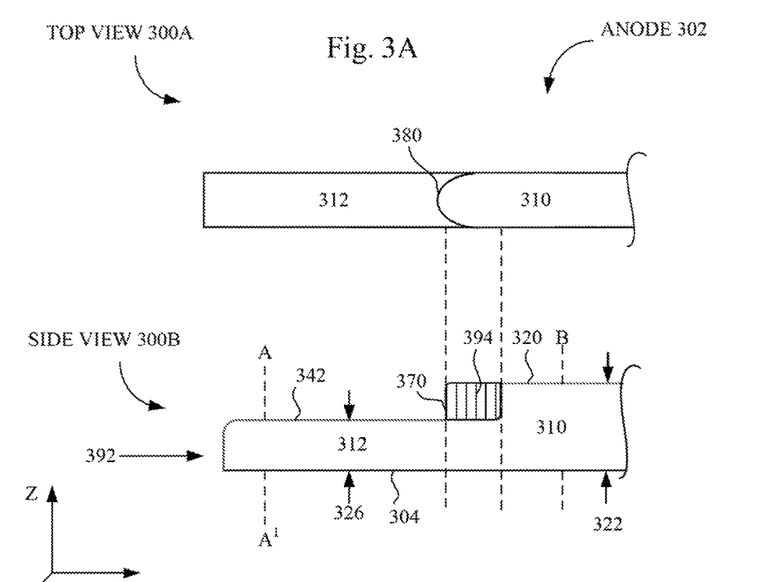
FIG. 3A shows, in accordance with an embodiment of the invention, an improved anode.

FIG. 3A shows, in accordance with an embodiment of the invention, an improved anode 302. View 300A is the top view while view 300B is the side view of improved anode 302. As can best be seen in side view 300B, improved anode 302 represents an erodable electrode that is elongated along the X direction. Anode 302 includes a base plane 304 that is parallel to the X-Y plane. Anode 302 includes an active portion 310 that spans of a first portion of anode 302 along the X direction (the anode being symmetrical about a longitudinal center and only a portion of the left half is shown). Active portion 310 has an active portion top surface 320 and a first thickness 322 that is measured along the Z direction.

FIG. 3A shows, for ease of understanding of the figures, the reference directions X, Y, and Z. These reference directions X, Y, and Z are orthogonal to one another and apply to side view 300B of FIG. 3A.

Figure 3B:
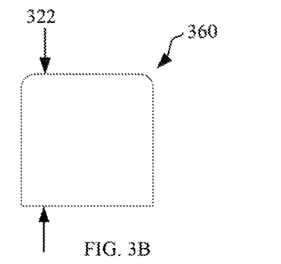
FIG. 3B shows, in accordance with an embodiment of the invention, a cross section profile that is taken along line B-B' of the anode of FIG. 3A.
Figure 3C:
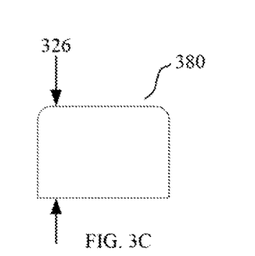
FIG. 3C shows, in accordance with an embodiment of the invention, a cross section profile that is taken along line A-A' of the anode of FIG. 3A.

FIG. 3B shows a cross section profile 360 that is taken along line B-B' of active portion 310. Thickness 322 of FIG. 3B is also shown in cross section profile 360 of FIG. 3B. Cross-section profile 380 is taken along line A-A' of FIG. 3A. Thickness 326 of end portion 312 (which is less than the thickness 322 of active portion 310) is shown in both side view 300B and in the cross-section profile 380 of FIG. 3C. The difference in thicknesses between the active portion and the end portion (best seen in side view 300B) allows design engineers to more precisely delineate the portion of the anode that would undergo electrical discharge since the active portion, being raised and closer to the cathode when installed, would experience electrical discharge while the end portion, being further away from the cathode, would experience less or no electrical discharge.

Figure 3D:
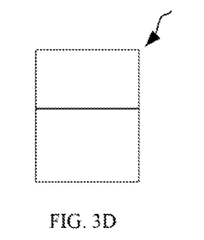
FIG. 3D is a front view of the anode of FIG. 3A when viewed along the direction of arrow 392.

With reference to FIGS. 3A and 3B, cross-section profile 360 forms a plane that is parallel to the Y-Z plane. Analogously, with reference to FIGS. 3A and 3C, cross-section profile 380 taken along line A-A' is also parallel to the Y-Z plane. FIG. 3D is a front view of anode 302 when viewed along the direction of arrow 392. As will be discussed later herein FIG. 3E, the end portion 312 may be omitted entirely, in one or more embodiments, without substantially changing the invention.

A transition structure 370 having a substantially vertical sidewall in the direction that is parallel to the Z direction is also shown. The transition structure connects the active portion top surface 320 with the end portion top surface 342.

In one or more embodiments, transition structure 370 has a substantially vertical sidewall having its base following along a curve formed in a plane parallel to the end portion top surface. With respect to top view 300A, this curve is shown as curve 396 at the base of transition structure 370. This curve is also replicated in the side view 300B.

In contrast with widely-held assumptions, the rather abrupt transition between active portion top surface 320 and the end portion top surface 342, implemented by the vertical sidewall 394 instead of by a gradually sloped surface as in the case of the prior art anode, appears to reduce non-uniform erosion that were found earlier in roll-off portion 206 of FIGS. 2A-2C. The non-uniform erosion performance in transition portion 394 substantially matches the non-uniform erosion performance found over the active portion of the above-discussed prior art anode and represents a substantial improvement over the erosion performance of the portion that is formerly represented by roll-off portion 206 and end portion 204 of FIG. 2A. As is evident from the above, improved anode 302 essentially eliminates the sloped surface from the transition region between the active portion and the end portion.

In the example of FIG. 3A, the curve 396 of the base of substantially vertical transition structure 370 follows a half-circle whose diameter is the width of the anode. However, this is not limiting and such curve may be implemented by any gradually changing shape, whether spanning the entire width of the anode or only a portion of the width of the anode. For example, parabolic, elliptical or non-circular shapes may be implemented for curve 396. It is preferred, however, that curve 396 be symmetrical about the longitudinal center line (when viewed from the top) of the anode.

It should also be understood that due to machining and other engineering considerations, the corners where planes and lines meet may be rounded with a radius. This may be the case, for example with the intersection between top surface 320 of active portion 310 and the vertical sidewall 394 of transition structure 370.

Figure 3E:
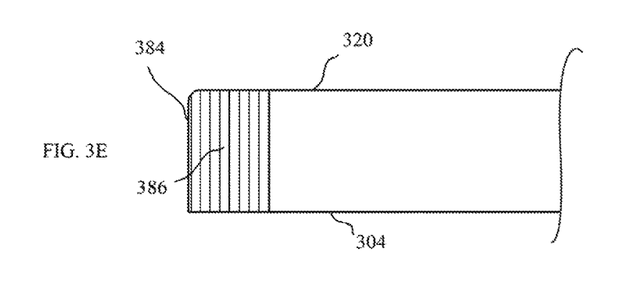
FIG. 3E shows an example alternative embodiment whereby the end portion of the anode of FIGS. 3A and 3B may be omitted.

FIG. 3E shows an example alternative embodiment whereby the end portion of 312 of FIGS. 3A and 3B may be omitted. In this embodiment, transition structure 384 extends all the way from active portion top surface 320 to base plane 304. As in the case with the example of FIGS. 3A and 3B, transition structure 384 also has substantially vertical sidewall 386 (and exactly vertical 90-degree with base plane 304 in an embodiment) and the base of transition structure 384 also follows a curve formed in base plane 304.

Figure 4A:
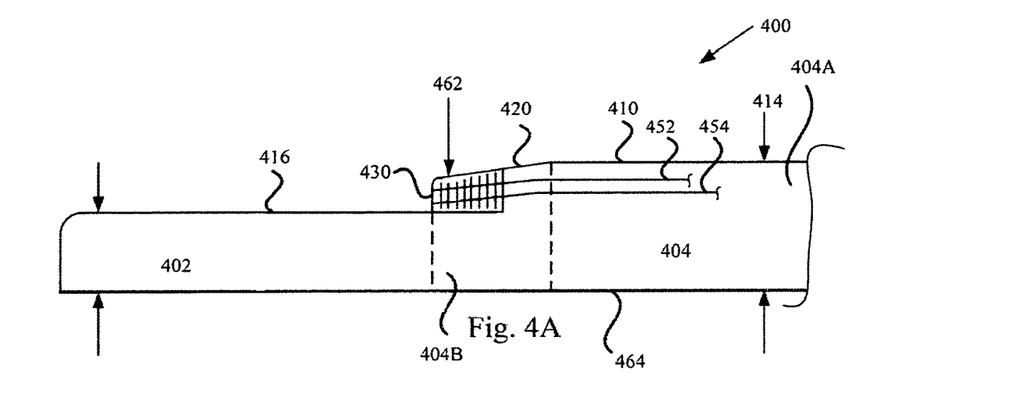
FIG. 4A shows an alternative embodiment whereas a portion of the active portion is slightly tapered from the more planar active portion top surface toward the top surface of the end portion.

FIG. 4A shows an alternative embodiment whereas a portion of the active portion is slightly tapered from the more planar active portion top surface toward the top surface of the end portion. As shown in FIG. 4A, end portion 402 of anode 400 is similar to the end portion discussed in connection with the anode of FIGS. 3A and 3B. Active portion 404 includes a non-tapered active portion 404A and a tapered active portion 404B.

End portion 402 has a thickness 412 that is less than a thickness 414 of non-tapered active portion 404A of active portion 404. Non-tapered active portion 404A includes a top surface 410 that is contiguous with the remaining planar portion of the active portion top surface and is at the same height therewith.

Between end portion 402 and non-tapered active portion 404A, there is implemented a tapered active portion 404B that is characterized by having a top surface 420 tapered from the height of the top surface 410 of the non-tapered active portion 404 toward the top surface 416 of end portion 402. However this taper does not extend all the way from top surface 410 of non-tapered active portion 404A to touch top surface 416 of end portion 402. Instead, top surface 420 of tapered active portion 404B terminates at the substantially vertical sidewall 430. In an example, the taper height 442 (i.e., the distance between the top of the vertical sidewall 430 and the height of planar top surface 410 of active portion 404 is approximately 1 mm and the dimension of the tapered active portion 404B along the X direction is approximately 10 mm.

Top surface 410 of non-tapered active portion 404A, together with top surface 420 of tapered active portion 404B, is designed to mimic the natural contour that the overall top surface of the active portion of the anode would assume after some operational time due to natural electrode erosion. Parallel lines 452 and 454 represent top surfaces of the anode over time as the anode is worn down, and these parallel lines 452 and 454 have naturally occurring erosion profiles.

As can be appreciated from the foregoing, the "pre-shaped" top surface of the active portion of a new anode 400 parallels these naturally occurring erosion profiles. By "pre-shaping" the active portion top surface of a new anode to match the naturally occurring anode shape due to anode erosion over time, this embodiment ensures a consistent electrical discharge profile (and improved output laser light consistency) when a new anode is installed and in the period between servicing as the active portion of the anode is worn down over time.

Figure 4B:
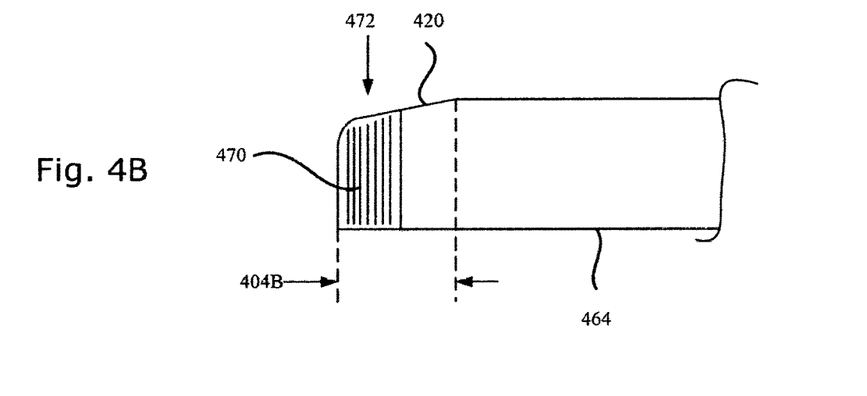
FIG. 4B shows an alternative embodiment whereby the end portion of the anode of FIG. 4A may be omitted.

FIG. 4B shows an alternative embodiment whereby the end portion of 402 of FIG. 4A may be omitted. In this embodiment, vertical sidewalls 470 of the transition structure 472 extends all the way from top surface 420 of tapered active portion 404B to base plane 464 of the anode. As in the case with the example of FIGS. 3A and 3B, transition structure 472 also has substantially vertical sidewall 470 (and exactly vertical 90-degree with base plane 464 in an embodiment) and the base of transition structure 472 also follows a curve formed base plane 464.

In one or more embodiments, the invention relates to an erodable cathode for use in generating gas discharge laser. The erodable cathode has an active portion and an end portion with the end portion having a thickness that is less than the thickness of the active portion. A raised spine is built into the top surface of the elongated cathode, thereby causing the cross-section profile of the cathode to assume a stepped cross section profile. The raised spine protrudes more toward the anode and serves to concentrate electrical discharge to the spine for more precise control of electrical discharge and cathode erosion.

However, it has been found that, for example, in the edge region between the active portion and the end portion, erosion may be more severe in some chambers. To prevent premature spine exhaustion at this location (or anywhere else along the cathode spine where enhanced erosion is found), one or more embodiments of the invention propose to locally lower the shoulder of the stepped cross-section profile to enable the thickness of the spine above the shoulder locally at that location to be greater than the height of the spine above the shoulder elsewhere (such as in the active portion that experiences less erosion).

By lowering the shoulder locally instead of raising the spine locally where erosion is more intense, the top surface of the spine remains substantially planar at that location with the rest of the top surface of the active portion to avoid unduly raising the spine above the mean surface of the spine and thus avoiding unevenly concentrating electrical discharge to such raised spine portion. In an embodiment, locally lowering the shoulder is accomplished by locally removing material and/or locally creating an indentation or depression in the shoulder portion, thereby artificially enlarging the distance between the top of the spine and the shoulder at that location, which in effects locally increasing the thickness of the spine at that location.

Figure 5A:
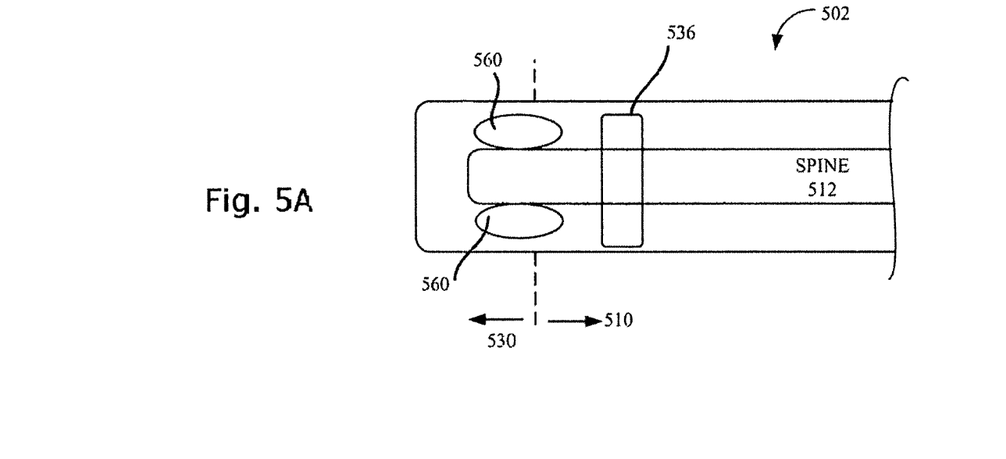
FIG. 5A shows, in accordance with an embodiment of the invention, a top view of an improved cathode.

FIG. 5A shows, in accordance with an embodiment of the invention, a top view of cathode 502. This top view represents the view of the disassembled cathode. However, when the cathode is assembled in the chamber, the view into the page represents the view toward the cathode from the spatial region between the anode and the cathode.

Figure 5B:
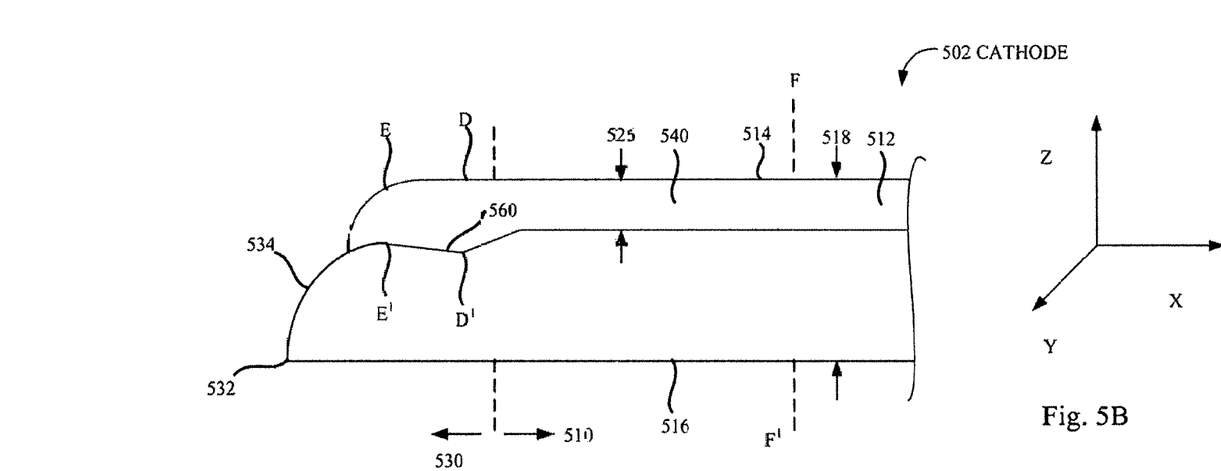
FIG. 5B shows, in accordance with an embodiment of the invention, the side view of the cathode of FIG. 5A

FIG. 5B shows the side view of the same cathode 502. With reference to FIG. 5B, there is shown an erodable cathode 502 that is elongated along the X direction, extending to the right of the FIG. 5B. There is shown an active portion 510, representing the portion of the electrode that is designed to undergo electrical discharge along its top spine

512. The top surface 514 of the spine 512 of active portion 510 is substantially parallel to a base plane 516, which is parallel to the X-Y plane. It should be understood that the cathode is symmetrical about a longitudinal center point in that the same active portion and end portion structures are replicated at the other end of the elongated eroded electrode (not shown in FIG. 5B to simplify the illustration). As before, directions X, Y, and Z are mutually orthogonal.

Figure 5C:
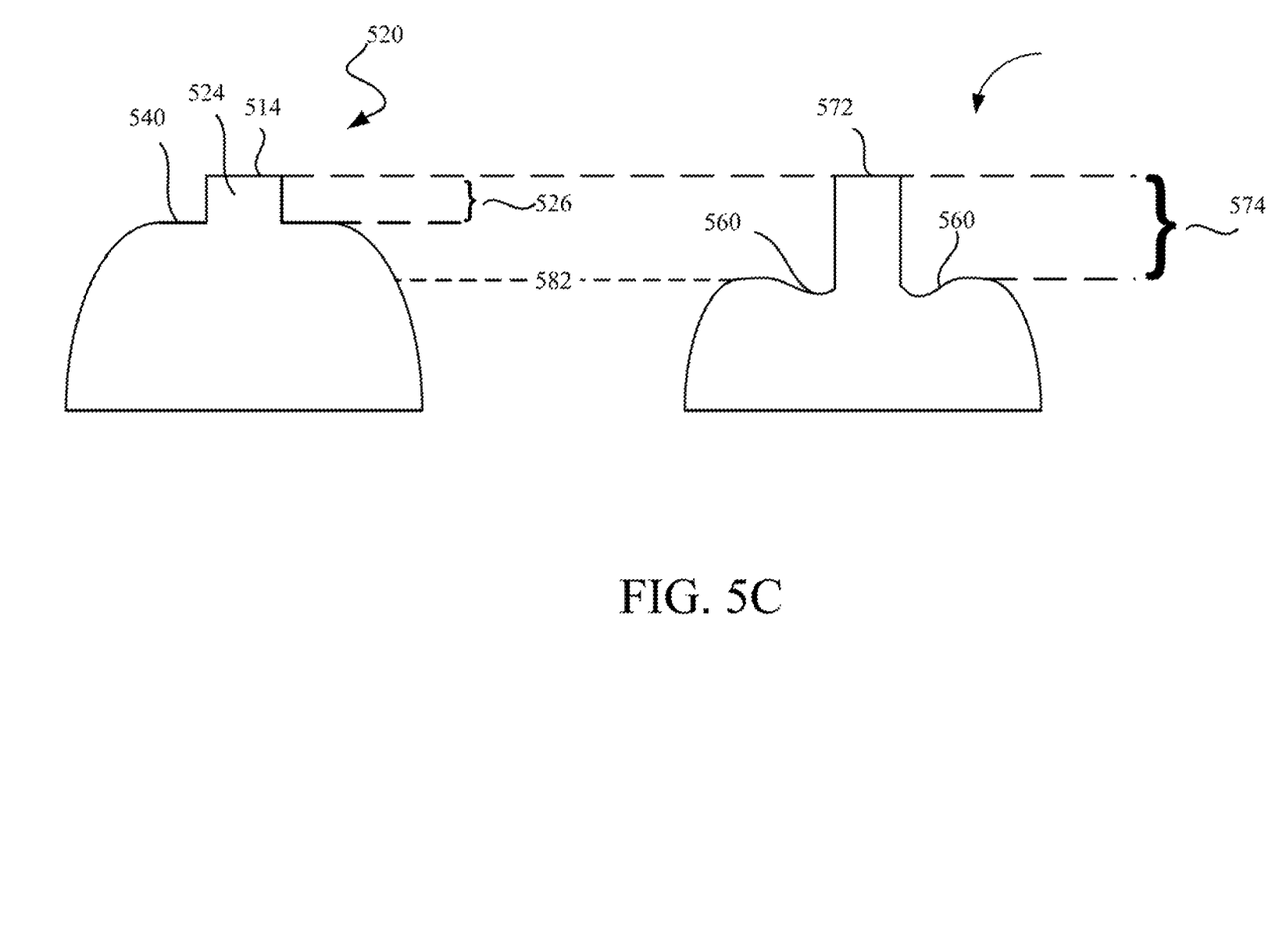
FIG. 5C shows, in accordance with an embodiment of the invention, two cross section profiles 520 and 570 that are taken along lines D-D' and F-F' respectively of the anode of FIG. 5B.

Active portion 510 spans a first portion of the cathode along the X direction and has an active surface top surface 514 a as well as a thickness 518. A cross-section profile of active portion 510 is shown in FIG. 5C. In this profile, it can be seen that the cross-section profile 520 is a stepped profile in that there exists a shoulder 540 and a distinct step 524 which, when extended along the electrode in the X direction (into and out of the page in FIG. 5C) forms the aforementioned spine 512. Step 524 has a step height 526 as shown.

An end portion 530 extends from the active portion 510 toward distal end 532 of the cathode. As can be seen in the example of FIG. 5B, end portion 530 is a gradually tapered structure and has a slope 534 that gradually tumbles from shoulder plane 540 toward base plane 516. However, it is not necessary that this slope 534 is a smooth gradual slope all the way between shoulder plane 540 and base plane 516. It is possible that only part of slope 534 is a gradual slope and an abrupt (or other shape) termination may be implemented for distal end 532 since only a portion of end portion 530 of some cathodes may be expected to be exposed to some electrical discharge in use.

In some chamber installations, some portion of end portion 530 will experience electrical discharge. In some chambers, it has been found, that the edge portion between the active portion and the end portion represents the portion where rapid spine erosion occurs. In other chambers, it has been found that the portion where the shoulder plane 540 transitions from being substantially horizontal (i.e., parallel to the X-Y plane) and begins to gradually slope downward towards base plane 516 represents the portion where rapid spine erosion occurs. These examples are not, however, limiting with respect to the specific location along the cathode where the invention may be implemented.

In accordance with one or more embodiments of the invention, the distance between the shoulders to the top of the spine is artificially increased at the location where enhanced non-uniform erosion has been observed in spent cathodes. This location may be in the end portion or at the edge portion as discussed earlier, or in any other location along the spine.

One major limitation in designing an increase in the height of the spine pertains to the fact that it is necessary to keep the top surface of the spine substantially even with the mean height of the top surface of the spine of the active region. This is to prevent a portion of the spine from protruding into the space between the cathode and the anode since such protrusion may unduly concentrate electrical discharge and negatively impacts the quality of the laser light produced.

As seen in FIG. 5A, if the erosion of spine 512 is permitted to consume the entire thickness of the spine at location 536, the enlarged resulting area that is a combination of the locally exhausted spine and the surrounding shoulder surface area would present a larger electrical discharge area. When this happens, undesirable and unplanned electrical discharge may occur at the location where the spine is prematurely exhausted. The irregular electrical discharge may give rise to inconsistent or out-of-specification laser light production, in an example.

By increasing the thickness of the spine locally, i.e., by locally increasing the distance from the shoulder at or near the base of the spine to the top height of the spine at the location where spine erosion has been found to be higher, embodiments of the invention extend the time it takes to erode through the thickness of the spine at this location. In this manner, local premature spine exhaustion is avoided. Accordingly, the mean time between service (MTBS) may be increased.

With reference to FIGS. 5A and 5D, depressions or indentations 560 are shown, representing the removal of some shoulder material in approximately the same longitudinal vicinity where enhanced spine erosion has been found to occur (such as during post-service inspection of spent cathodes). In the example of FIG. 5A, this location is also indicated by line D-D'.

With reference to FIG. 5C, in the cross-section profile 570 taken along line D-D' of FIG. 5B, the shoulder height 582 is diminished relative to the shoulder height 540 in the cross profile 520 of FIG. 5C (which is taken along line F-F' of FIG. 5B). This is due to the fact that some material has been removed from the shoulder region in cross-section profile 570.

However, despite the fact that the top surface 572 of cross-section profile 570 of FIG. 5C is substantially planar with, or at the same height as, the top surface 514 of cross section profile 520 of FIG. 5C, the apparent spine thickness 574 is increased (measured from top surface 572 to line 582, which is the top of the shoulder where indentation 560 exists) relative to spine thickness 526 of cross-section profile 520 of FIG. 5C. In an example, thickness 526 is approximately 1 mm while thickness 574 is approximately 1.5 mm. During use, despite the fact that the location at line D-D' (see FIG. 5B) suffers a higher rate of erosion, the spine at this location does not get exhausted prematurely because there is now more spine thickness at this location (see thickness 574 of FIG. 5D).

As can be appreciated from the foregoing, embodiments of the invention improve erosion resistance performance by eliminating the sloped transition between the active portion and the end portion of the anode. Since this sloped transition portion was found to give rise to a higher incidence of non-uniform erosion, this elimination of the sloped transition, while counter-intuitive to conventional thinking about electrical discharge, nevertheless has been found to enable the replication of the non-uniform erosion performance found in the active portion such that the end portion now exhibits similarly good non-uniform erosion performance even if the transition is now a less-smooth (i.e., more abrupt) vertical sidewall.

By pre-shaping the top surface of the anode to resemble the eroded profile of the anode after some operational time has passed, embodiments of the invention ensure a more consistent output laser light quality by presenting to the cathode a surface profile of the top surface of the active area of the anode that is parallel to the surface profile that would naturally occurs after some use. In this manner, the top surface of the anode is evenly eroded from the beginning (i.e., with a new anode) and the top surface of the anode erodes evenly (relative to the spatial distance from the cathode) as time passes.

With respect to the cathode, by providing a local indentation in the shoulder portion in the location of the cathode where spine erosion has been found to be enhanced, embodiments of the invention locally increase the height of the top of spine relative to the shoulder (and thereby locally increasing spine thickness) at that location without having to locally raise a portion of the spine top surface above the mean height of the top surface of the spine. This protrusion, if permitted to occur, would have negatively affected the ability to evenly distribute the electrical discharge along the top surface of the active area of the cathode spine.

While this invention has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

What is claimed is:

1. An elongated erodable electrode for use in generating gas discharge laser, said electrode having a base plane, said base plane parallel to an X-Y plane formed by an x-direction and a y-direction orthogonal to said x-direction, said electrode elongated along said x direction, comprising
    an active portion spanning a first portion of said electrode along said x direction, said active portion having an active portion top surface, said active portion having a first thickness measured along a z direction orthogonal to both said x direction and said y direction, said active portion having a first stepped cross-section profile parallel to a Y-Z plane formed by said z direction and said y direction;
    an end portion spanning a second portion of said electrode along said x direction, said end portion having an end portion top surface, said end portion having a second thickness measured along said z direction, wherein said second thickness is less than said first thickness; and
    a transition structure, wherein said transition structure includes substantially vertical sidewall connecting said end portion top surface with said active portion top surface, said substantially vertical sidewall being substantially parallel to said z direction,
    wherein said active portion comprises a non-tapered active portion and a tapered active portion, said non-tapered active portion having a first top surface that is part of said active portion top surface, said tapered active portion having a second top surface that is part of said active portion top surface, said first top surface coupled to said second top surface, said second top surface being sloped relative to said first top surface and coupled with said substantially vertical sidewall, said non-tapered active portion having a thickness that is greater than a thickness of said tapered active portion.

2. The electrode of claim 1 wherein said end portion has a second stepped cross-section profile parallel to said Y-Z plane.

3. The electrode of claim 1 wherein said substantially vertical sidewall is curved along a curve formed in a plane parallel to said end portion top surface.

4. The electrode of claim 3 wherein said curve is part of a circle.

5. An elongated erodable electrode for use in generating gas discharge laser, said electrode having a base plane, said base plane parallel to a X-Y plane formed by an X direction and a Y direction orthogonal to said X direction, said electrode elongated along said X direction, comprising
    an active region spanning a first portion of said electrode along said x direction, said active region having an active region top surface, said active region having a first thickness measured along a Z direction orthogonal to both said X direction and said Y direction, said active region having a first stepped cross-section profile parallel to a Y-Z plane formed by said Z direction and said direction;
    an end region spanning a second portion of said electrode along said X direction, said end region having an end region top surface, said end region having a second thickness measured along said Z direction, said second thickness is less than said first thickness, said end region having a second stepped cross-section profile parallel to said plane formed by said Z direction and said Y direction;
    a transition region between said active region and said end region;
    wherein a shoulder of said second stepped cross-section profile includes an indentation that renders a height of a step of said second stepped cross-section profile larger than a step of said first stepped cross-section profile,
    and wherein said active region top surface is parallel to said base plane and wherein said end region top surface is sloped relative to said base plane.

6. The electrode of claim 5 wherein said electrode is configured for use as a cathode disposed opposite a grounded anode.

7. An elongated erodable electrode for use in generating gas discharge laser, said electrode having a base plane, said base plane parallel to a X-Y plane formed by an X direction and a Y direction orthogonal to said X direction, said electrode elongated along said X direction, comprising
    an active region spanning a first portion of said electrode along said x direction, said active region having an active region top surface, said active region having a first thickness measured along a Z direction orthogonal to both said X direction and said Y direction, said active region having a first stepped cross-section profile parallel to a Y-Z plane formed by said Z direction and said Y direction,
    wherein a shoulder of said first stepped cross-section profile at a first longitudinal position in said active region includes removed portion that renders a height of a step of said first stepped cross-section profile at said first longitudinal position greater than a step of said first stepped cross-section profile at a second longitudinal position in said active region, and
    wherein a top surface of said step of said first stepped cross-section profile at said first longitudinal position does not protrude above a top surface of said step of said first stepped cross-section profile at said second longitudinal position;
    an end region spanning a second portion of said electrode along said X direction, said end region having an end region top surface, said end region having a second thickness measured along said Z direction, said second thickness is less than said first thickness; and
    a transition region between said active region and said end region, wherein said active region top surface is parallel to said base plane and wherein said end region top surface is sloped relative to said base plane.

8. The electrode of claim 7 wherein said electrode is configured for use as a cathode disposed opposite a grounded anode.

9. A laser apparatus, comprising:
    an elongated erodable anode for use in generating gas discharge laser, said anode having an anode base plane, said anode base plane parallel to an X-Y plane formed by an x-direction and a y-direction orthogonal to said x-direction, said anode elongated along said x direction, said elongated erodable anode including at least an anode active portion spanning a first portion of said anode along said x direction, said anode active portion having an anode active portion top surface, said anode active portion having a first anode thickness measured along a z direction orthogonal to both said x direction and said y direction, said anode active portion having a first anode stepped cross-section profile parallel to a Y-Z plane formed by said z direction and said y direction, an anode end portion spanning a second portion of said anode along said x direction, said anode end portion having an anode end portion top surface, said anode end portion having a second anode thickness measured along said z direction, wherein said second anode thickness is less than said first anode thickness, and an anode transition structure, wherein said anode transition structure includes substantially vertical anode sidewall connecting said anode end portion top surface with said anode active portion top surface, said substantially vertical anode sidewall being substantially parallel to said z direction, wherein said anode active portion comprises a non-tapered anode active portion and a tapered anode active portion, said non-tapered anode active portion having a first anode top surface that is part of said anode active portion top surface, said tapered anode active portion having a second anode top surface that is part of said anode active portion top surface, said first anode top surface coupled to said second anode top surface, said second anode top surface being sloped relative to said first anode top surface and coupled with said substantially vertical anode sidewall, said non-tapered anode active portion having a thickness that is greater than a thickness of said tapered anode active portion.

10. The laser apparatus of claim 9 wherein said anode end portion has a second anode stepped cross-section profile parallel to said Y-Z plane.

11. The laser apparatus of claim 9 wherein said substantially vertical anode sidewall is curved along a curve formed in a plane parallel to said anode end portion top surface.

12. The laser apparatus of claim 11 wherein said curve is part of a circle.

13. The laser apparatus of claim 9 further comprising:

an elongated erodable cathode for use in generating gas discharge laser, said cathode having a cathode base plane, said cathode base plane parallel to said X-Y plane, said cathode elongated along said X direction, said elongated erodable cathode including at least a cathode active region spanning a first portion of said cathode along said x direction, said cathode active region having a cathode active region top surface, said cathode active region having a first cathode thickness measured along said Z direction, said cathode active region having a first stepped cathode cross-section profile parallel to said Y-Z plane, wherein a shoulder of said first cathode stepped cross-section profile at a first longitudinal position in said cathode active region includes removed portion that renders a height of a step of said first cathode stepped cross-section profile at said first longitudinal position greater than a step of said first stepped cathode cross-section profile at a second longitudinal position in said cathode active region, and wherein a cathode top surface of said step of said first cathode stepped cross-section profile at said first longitudinal position does not protrude above a cathode top surface of said step of said first cathode stepped cross-section profile at said second longitudinal position.

14. The laser apparatus of claim 13 wherein said elongated erodable cathode further comprising a cathode end region spanning a second cathode portion of said cathode along said X direction, said cathode end region having a cathode end region top surface, said cathode end region having a second cathode thickness measured along said Z direction, said second cathode thickness is less than said first cathode thickness.

15. The laser apparatus of claim 14 wherein said cathode active region top surface is parallel to said cathode base plane and wherein said cathode end region top surface is sloped relative to said cathode base plane.

* * * * *